(12) United States Patent
Habuta et al.

(10) Patent No.: US 7,645,499 B2
(45) Date of Patent: Jan. 12, 2010

(54) OPTICAL INFORMATION RECORDING MEDIUM AND MANUFACTURING METHOD THEREOF

(75) Inventors: Haruhiko Habuta, Osaka (JP); Ken'ichi Nagata, Nishinomiya (JP); Yoshitaka Sakaue, Hirakata (JP); Hideo Kusada, Osaka (JP)

(73) Assignee: Panasonic Corporation, Osaka (JP)

( * ) Notice: Subject to any disclaimer, the term of this patent is extended or adjusted under 35 U.S.C. 154(b) by 596 days.

(21) Appl. No.: 10/530,426

(22) PCT Filed: Oct. 9, 2003

(86) PCT No.: PCT/JP03/12937

§ 371 (c)(1),
(2), (4) Date: Apr. 5, 2005

(87) PCT Pub. No.: WO2004/034390

PCT Pub. Date: Apr. 22, 2004

(65) Prior Publication Data
US 2006/0126481 A1    Jun. 15, 2006

(30) Foreign Application Priority Data
Oct. 10, 2002  (JP) ............................. 2002-297291

(51) Int. Cl.
*B32B 3/02*      (2006.01)
*G11B 7/243*     (2006.01)
*G03C 1/76*      (2006.01)

(52) U.S. Cl. .................... 428/64.4; 428/64.5; 428/64.6; 430/270.13; 430/271.1; 430/272.1

(58) Field of Classification Search ....... 428/64.2–64.6; 430/270.11–270.13, 271.1, 272.1
See application file for complete search history.

(56) References Cited

U.S. PATENT DOCUMENTS

| | | | |
|---|---|---|---|
| 5,817,389 A * | 10/1998 | Ono | .......................... 428/64.1 |
| 6,009,070 A | 12/1999 | Higuchi et al. | |
| 6,456,584 B1 | 9/2002 | Nagata et al. | |
| 6,469,977 B1 | 10/2002 | Kitaura et al. | |
| 6,670,014 B2 | 12/2003 | Nishihara et al. | |
| 6,841,217 B2 * | 1/2005 | Nishihara et al. | .......... 428/64.1 |

(Continued)

FOREIGN PATENT DOCUMENTS

EP    1 172 811 A2    7/2001

(Continued)

*Primary Examiner*—Mark Ruthkosky
*Assistant Examiner*—Gerard T Higgins
(74) *Attorney, Agent, or Firm*—Hamre, Schumann, Mueller & Larson, P.C.

(57) ABSTRACT

The optical information recording medium of the present invention includes a plurality of information layers provided on a substrate and an optical separating layer provided between information layer adjacent to each other, and information is recorded or reproduced by irradiation of a laser beam. When an information layer that is provided closest to a laser beam incident side of the plurality of information layers is taken as a first information layer and an optical separating layer provided in contact with the first information layer is taken as a first optical separating layer, then the first information layer comprises a recording layer, a transmittance adjusting layer that adjusts a transmittance of the first information layer, and a low refractive index layer provided between the transmittance adjusting layer and the first optical separating layer.

6 Claims, 4 Drawing Sheets

U.S. PATENT DOCUMENTS

| | | | |
|---|---|---|---|
| 7,420,908 B2 * | 9/2008 | Kishima et al. | 369/275.2 |
| 2002/0054983 A1 * | 5/2002 | Nishihara et al. | 428/212 |
| 2002/0122379 A1 | 9/2002 | Tamada et al. | |
| 2003/0180473 A1 * | 9/2003 | Nishihara et al. | 427/457 |
| 2004/0105182 A1 * | 6/2004 | Nishihara et al. | 359/883 |
| 2004/0246868 A1 | 12/2004 | Kishima et al. | |

FOREIGN PATENT DOCUMENTS

| | | |
|---|---|---|
| JP | 10-83570 | 3/1998 |
| JP | 2000-36130 | 2/2000 |
| JP | 2002-175645 | 6/2002 |
| JP | 2003-317314 | 11/2003 |
| WO | WO 03025922 A1 * | 3/2003 |
| WO | WO 03088233 A1 * | 10/2003 |

* cited by examiner

OPTICAL INFORMATION RECORDING MEDIUM AND MANUFACTURING METHOD THEREOF

TECHNICAL FIELD

The present invention relates to an optical information recording medium having a multilayered structure in which information can be recorded, erased, rewritten and reproduced optically on a plurality of information layers by irradiation of laser beams or the like and a method for manufacturing the same.

BACKGROUND ART

In a phase change optical information recording medium used as a rewritable medium, information can be recorded, erased and rewritten by utilizing a recording layer in which phase change is caused reversibly between a crystalline phase and an amorphous phase. When such a recording layer is irradiated with a laser beam at a high power and then cooled, the irradiated portion becomes an amorphous phase. Furthermore, when the amorphous portion of the recording layer is irradiated with a laser beam at a low power and then gradually cooled, the irradiated portion becomes a crystalline phase. Therefore, in the phase change optical information recording medium, the recording layer can be changed arbitrarily into the amorphous phase or the crystalline phase by irradiating the recording layer with a laser beam whose power is modulated between a high power level and a low power level. In such an optical information recording medium, information is recorded by utilizing a difference between the reflectance in the amorphous phase and the reflectance in the crystalline phase.

In recent years, in order to improve the recording density of the optical information recording medium, various techniques have been researched. For example, the following techniques have been researched: a technique by which a smaller recording mark is recorded by using a blue-violet laser beam having a relatively short wavelength; and a technique by which a smaller recording mark is recorded by reducing the thickness of a substrate provided on the laser beam incident side and using a lens having a large numerical aperture (NA). Moreover, there is a technique by which two information layers, each of which include a recording layer, are provided, and information is recorded and reproduced on each of the two information layers by using a laser beam incident from one side (e.g., JP2000-36130A).

FIG. 4 shows an example of a structure of a conventional optical information recording medium in which two information layers are provided. In the conventional optical information recording medium 101, a first information layer 103, an optical separating layer 104 and a second information layer 105 are provided in this order from the laser beam, incident side between a first substrate 102 and a second substrate 106. In the first information layer 103, a protective layer 1031, a recording layer 1032, a protective layer 1033, a reflective layer 1034 and a transmittance adjusting layer 1035 are provided in this order from the laser beam incident side.

Thus, in the optical information recording medium 101 in which information is recorded and reproduced in the two information layers by irradiation of a laser beam from one side, recording and reproduction of the second information layer 105 provided on the side opposite to the laser beam incident side is performed by using a laser beam that has been transmitted through the first information layer 103 provided on the laser beam incident side.

In order to perform recording and reproduction in such an optical information recording medium 101, it is preferable that the first information layer 103 has a transmittance as high as possible. Therefore, in the first information layer 103, a transmittance adjusting layer 1035 made of a dielectric material having a high refractive index is provided in contact with the reflective layer 1034 in order to increase the transmittance. As a dielectric material having a high refractive index, for example, $TiO_2$, $Nb_2O_5$ and materials containing these can be used.

The optical information recording medium 101 provided with the transmittance adjusting layer 1035 as described above generally is manufactured in the following process order to facilitate film-formation.

(a) a process of forming the second information layer 105 on the second substrate 106.

(b) a process of forming the optical separating layer 104 on the second information layer 105.

(c) a process of forming the first information layer 103 on the optical separating layer 104.

(d) a process of attaching the first substrate 102 onto the first information layer 103.

In order words, in the conventional optical information recording medium 101, when forming the first information layer 103 on the optical separating layer 104 in the process (c), first, the transmittance adjusting layer 1035 is formed on the optical separating layer 104, using a dielectric material having a high refractive index.

However, when the inventors produced the transmittance adjusting layer 1035 with a single-wafer film-forming apparatus for single wafer processing having a plurality of film-formation chambers, the following was made evident. When forming the transmittance adjusting layer 1035 with a dielectric material having a high refractive index in a first film-formation chamber, since the dielectric material having a high refractive index is very sensitive to an atmosphere for film formation, the film-forming rate tends to be varied by the influence of, for example, water contained in a base material (the state in which the second information layer 105 and the optical separating layer 104 are formed on the second substrate 106). When a load lock chamber, which is the first chamber when a base material is introduced to a film-formation chamber, is kept in a vacuum for a long time in order to solve this problem, the variation in the film-forming rate can be suppressed. However, in view of productivity, this is not preferable because when a vacuum is kept for a long time, the film-forming cycle takes a long time.

DISCLOSURE OF INVENTION

An optical information recording medium of the present invention comprises a substrate, a plurality of information layers provided on the substrate, and an optical separating layer provided between the information layers adjacent to each other, in which information is recorded or reproduced by irradiation of a laser beam is characterized in that when an information layer provided closest to the laser beam incident side of the plurality of information layers is taken as a first information layer, and the optical separating layer provided in contact with the first information layer is taken as a first optical separating layer. The first information layer comprises a recording layer that can change between two optically different states, a transmission adjusting layer that adjusts the transmittance of the first information layer, and a low refractive index layer provided between the transmittance adjusting layer and the first optical separating layer.

A method for manufacturing an optical information recording medium of the present invention is a method for manufacturing an optical information recording medium including at least a first information layer and a second information layer that are laminated via an optical separating layer, the method comprising:

(a) a step of forming the second information layer, (b) a step of forming the optical separating layer on the second information layer, and (c) a step of forming the first information layer on the optical separating layer, wherein the step (c) comprises a step of forming a low refractive index layer on the optical separating layer, a step of forming a transmittance adjusting layer on the low refractive index layer and a step of forming a recording layer.

BEST MODE FOR CARRYING OUT THE INVENTION

Figure 1:
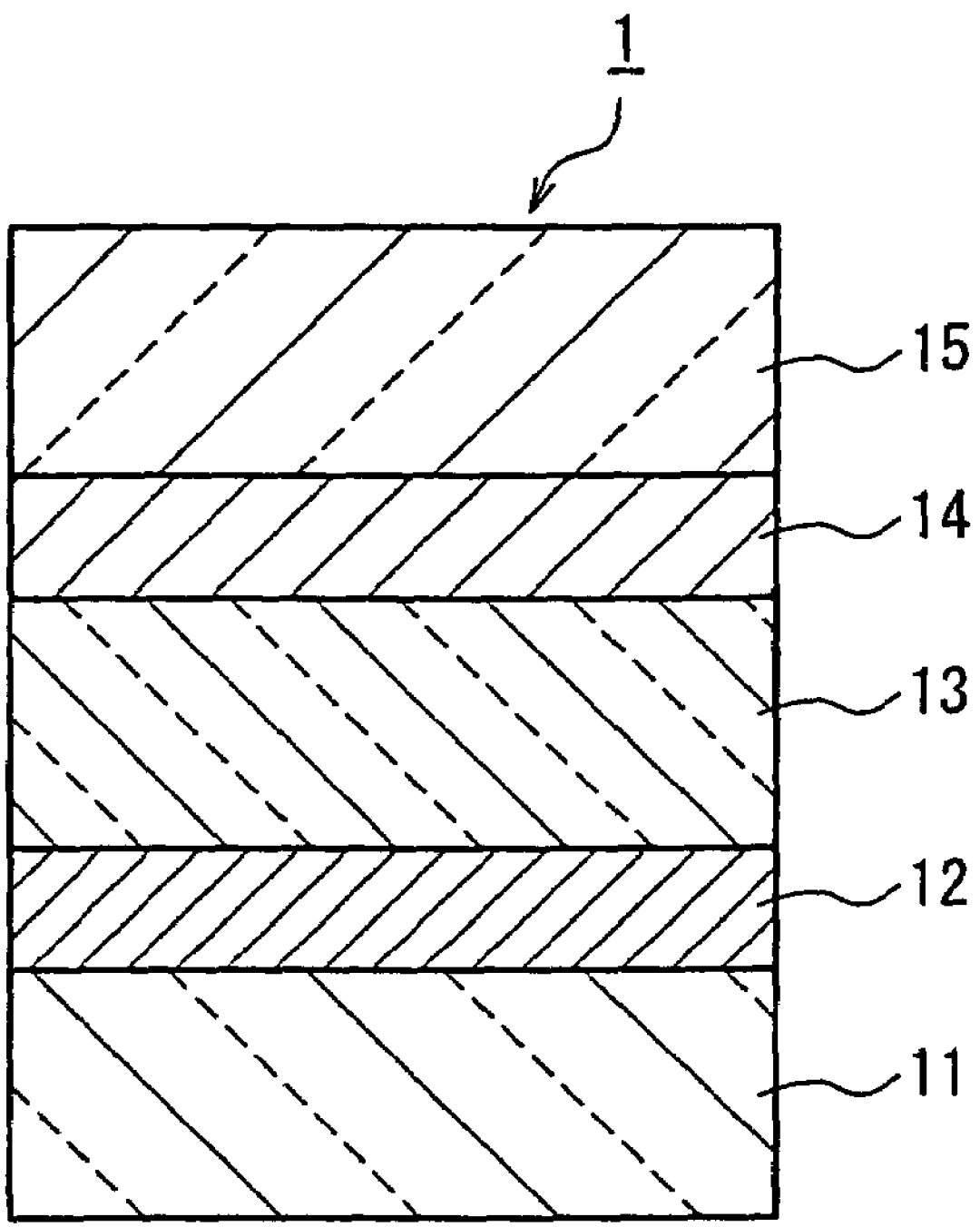
FIG. 1 is a cross-sectional view showing one embodiment of an optical information recording medium of the present invention.

In the optical information recording medium of the present invention, a low refractive index layer is provided between a transmission adjusting layer and a first optical separating layer in the first information layer provided closest to the laser beam incident side. Therefore, since a variation in the film-forming rate of the transmittance adjusting layer can be suppressed, the transmittance adjusting layer can be formed stably. Thus, an optical information recording medium that has good recording sensitivity and can provide a sufficient C/N, although it has a plurality of information layers, can be provided.

In the optical information recording medium of the present invention, when the refractive index of the low refractive index layer with respect to the laser beam is taken as n1 and the refractive index of the first optical separating layer is taken as n4, it is preferable that n1 and n4 satisfy a relationship $|n1-n4| \leq 0.5$, more preferably, $|n1-n4| \leq 0.1$. This is because satisfactory reflectance characteristics can be obtained.

In the optical information recording medium of the present invention, the recording layer contained in the first information layer is formed of a material that can change between a crystalline state and an amorphous state, and when the transmittance of the first information layer with respect to the laser beam when the recording layer is in a crystalline state is taken as Tc1 (%) and the transmittance of the first information layer with respect to the laser beam when the recording layer is in an amorphous state is taken as Ta1 (%), it is preferable that Tc1 and Ta1 satisfy a relationship: 40<Tc1, and 40<Ta1. This is because a laser beam can reach the information layer provided farther than the first information layer when viewed from the laser beam incident side in a sufficient amount of light.

In the optical information recording medium of the present invention, the first information layer further includes a reflective layer provided between the recording layer and the transmittance adjusting layer, and when the refractive index of the transmittance adjusting layer with respect to the laser beam is taken as n2 and the extinction coefficient thereof is taken as k2, and the refractive index of the reflective layer with respect to the laser beam is taken as n3 and the extinction coefficient thereof is taken as k3, it is preferable that at least one of the following relationships is satisfied.

$1.0 \leq (n2-n3) \leq 3.0$, and $1.0 \leq (k3-k2) \leq 4.0$.

This is because light is confined in the transmittance adjusting layer having a larger refractive index and a smaller extinction coefficient than those of the reflective layer, so that the interference effect of light becomes large, and therefore the transmittance of the first information layer can be increased.

In the optical information recording medium of the present invention, it is preferable that the low refractive index layer contains at least one selected from $SiO_2$, $Al_2O_3$, $LaF_3$, $ZrSiO_4$ and $ZrO_2$. This is because these materials have a small difference in the refractive index with respect to the materials generally used for the optical separating layer and are stable.

In the optical information recording medium of the present invention, it is preferable that the thickness of the low refractive index layer is 1 nm or more and 25 nm or less. This is because a reduction in the overall film-forming cycle time due to the formation of the low refractive index layer can be suppressed.

According to the method for manufacturing the optical information recording medium of the present invention, the transmittance adjusting layer is formed after the low refractive index layer is formed on the optical separating layer, so that a variation in the film-forming rate of the transmittance adjusting layer is suppressed, and thus the transmittance adjusting layer can be formed stably. Thus, an optical information recording medium that has good recording sensitivity and can provide a sufficient C/N, although it has a plurality of information layers, can be manufactured.

In the method for manufacturing the optical information recording medium of the present invention, with respect to a laser beam used when recording or reproducing information, the refractive index of the low refractive index layer formed in the process (c) described above is taken as n1, and the refractive index of the optical separating layer is taken as n4, it is preferable that the low refractive index layer and the optical separating layer are formed so that n1 and n4 satisfy a relationship:

$|n1-n4| \leq 0.5$.

This is because an optical information recording medium having satisfactory reflectance characteristics can be produced.

In method for manufacturing the optical information recording medium of the present invention, it is preferable to form the low refractive index layer with a material containing at least one selected from $SiO_2$, $Al_2O_3$, $LaF_3$, $ZrSiO_4$ and $ZrO_2$ in the process (c). This is because these materials have a small difference in the refractive index with respect to the materials generally used for the optical separating layer and are stable.

In the method for manufacturing the optical information recording medium of the present invention, it is preferable that the low refractive index layer is formed to a film thickness of 1 nm or more and 25 nm or less in the process (c). This is because a reduction in the overall film-forming cycle time due to the formation of the low refractive index layer can be suppressed.

Hereinafter, embodiments of the present invention will be described more specifically with reference to the accompanying drawings. However, the present invention is not limited by these drawings.

Embodiment 1

One embodiment of the optical information recording medium will be described. The optical information recording medium of the present invention is a recording medium including a plurality of information layers that are separated from each other by the optical separating layer. In this embodiment, an optical information recording medium including two information layers will be described, for example.

FIG. 1 is a cross-sectional view in the radial direction showing a schematic multilayered structure of a disk-shaped optical information recording medium 1 (hereinafter, referred to as "an optical disk 1") of this embodiment. As shown in FIG. 1, a first substrate 11, a first information layer 12, an optical separating layer (first optical separating layer) 13, a second information layer 14 and a second substrate 15 are laminated in this order in the optical disk 1. Each of the two information layers 12, 14 that are laminated via the optical separating layer 13 includes a recording layer (not shown), and information is recorded in these two information layers 12, 14.

Figure 2:
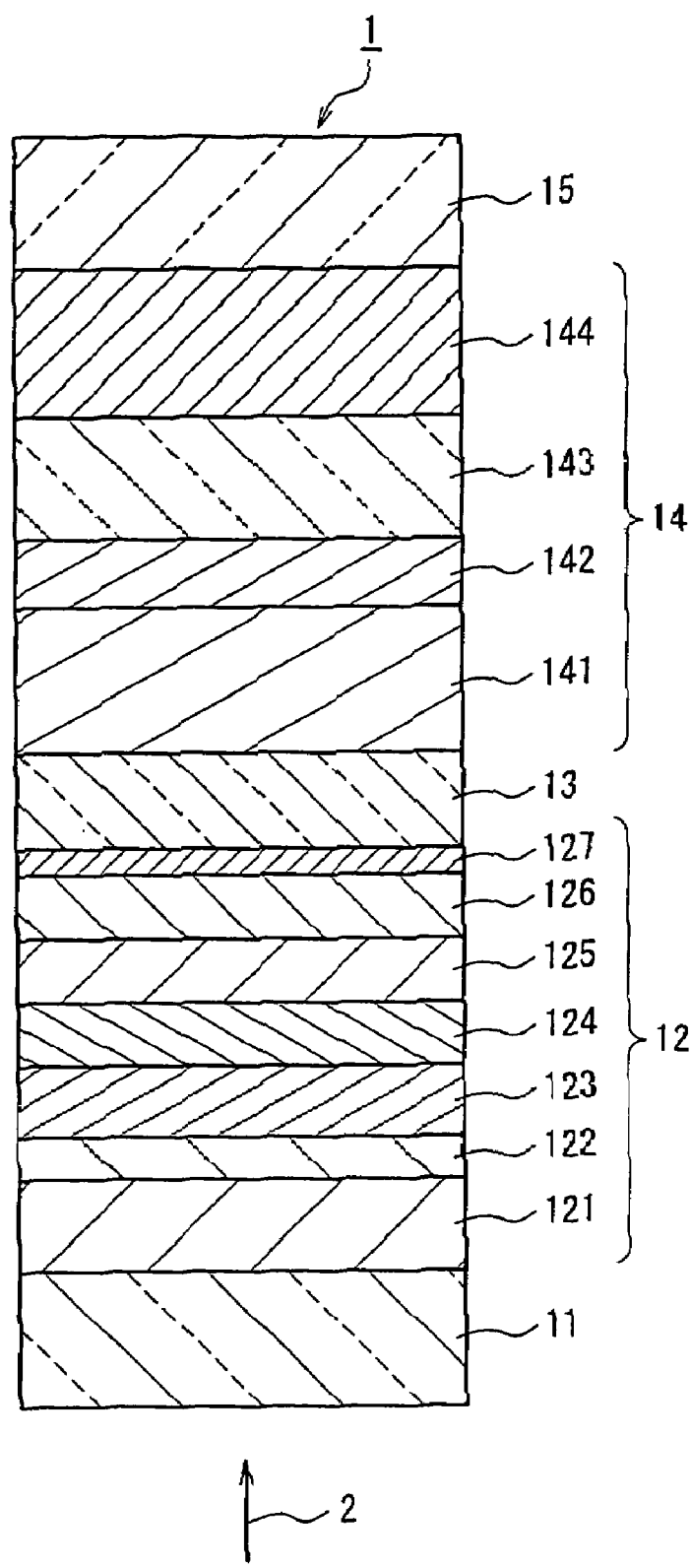
FIG. 2 is a cross-sectional view showing more specifically the structure of the optical information recording medium of FIG. 1.

FIG. 2 shows an example of a specific structure of the first information layer 12 and the second information layer 14 in the optical disk 1. A laser beam 2 used for recording or reproducing information is incident on the optical disk 1 from the first substrate 11 side. In the first information layer 12, a lower protective layer 121, a lower interface layer 122, a recording layer 123, an upper protective layer 124, a reflective layer 125, a transmittance adjusting layer 126 and a low refractive index layer 127 are formed sequentially in this order from the incident side of the laser beam 2. In the second information layer 14, a lower protective layer 141, a recording layer 142, an upper protective layer 143, and a reflective layer 144 are formed in this order sequentially from the incident side of the laser beam. In the naming for the interface layers and the protective layers, "lower" means that the layer is provided on the incident side of the laser beam 2 with respect to the recording layer, and "upper" means that the layer is provided on the side opposite to the incident side of the laser beam 2 with respect to the recording layer. As a method for forming each layer contained in the first information layer 12 and the second information layer 14, in general, electron beam evaporation, sputtering, CVD (Chemical Vapor Deposition), laser sputtering or the like can be used.

Hereinafter, each layer contained in the optical disk 1 will be described more specifically.

For the materials of the optical separating layer 13 and the first substrate 11, resins such as light-curing resin (in particular, UV-curing resin) or slow acting heat-curing resin can be used. The optical separating layer 13 and the first substrate 11 also can be formed by laminating a plurality of resins. For the materials of the optical separating layer 13 and the first substrate 11, it is preferable that the optical absorption with respect to the laser beam 2 used is small, and that the birefringence is optically small in a short wavelength region. For the first substrate 11, a transparent disk-shaped resins such as polycarbonate, amorphous polyolefin or polymethyl methacrylate (PMMA), or glass can be used. In this case, the first substrate 11 can be formed by being attached to the lower protective layer 121 of the first information layer 12 with a resin such as a light-curing resin (in particular, UV-curing resin) or slow acting heat-curing resin.

The second substrate 15 is a disk-shaped substrate. In the second substrate 15, for example, resins such as polycarbonate, amorphous polyolefin or PMMA, or glass can be used. Guide grooves for guiding the laser beam 2 may be formed, if necessary, on the surface of the second substrate 15 on the side of the second information layer 14. In the second substrate 15, it is preferable that the surface on the side opposite to the second information layer 14 side is smooth. For the material for the second substrate 15, polycarbonate is particularly preferable because of its excellent properties for transfer and mass production and its low cost. It is preferable that the thickness of the second substrate 15 is in the range from 400 μm to 1300 μm so that sufficient strength is provided and the thickness of the optical disk 1 is about 1200 μm. In the case where the thickness of the first substrate 11 is about 600 μm (which is a thickness that allows satisfactory recording/reproduction at NA=0.6), it is preferable that the thickness of the second substrate 15 is in the range from 550 μm to 650 μm. In the case where the thickness of the first substrate 11 is about 100 μm (which is a thickness that allows satisfactory recording/reproduction at NA=0.85), it is preferable that the thickness of the second substrate 15 is in the range from 1150 μm to 1250 μm.

According to the above-described structure, even with irradiation of the laser beam 2 from one side, information can be recorded/reproduced on/from the second information layer 14 with the laser beam 2 transmitted through the first information layer 12.

It should be noted that either one of the first information layer 12 and the second information layer 14 may be a read-only (ROM (Read Only Memory)) information layer or a write-once (WO (Write-Once)) information layer that can be written only once.

In the case of high density recording, the wavelength $\lambda$ of the laser beam 2 is preferably 450 nm or less, in particular, because the diameter of a spot obtained when the laser beam 2 is focused is determined by the wavelength $\lambda$ (as the wavelength $\lambda$ is smaller, the light can be focused into a smaller spot). Moreover, if the wavelength $\lambda$ is less than 350 nm, then the optical absorption with the optical separating layer 13 or the first substrate 11 for example is increased. For these reasons, it is more preferable that the wavelength $\lambda$ is in the range from 350 nm to 450 nm.

Next, each layer constituting the first information layer 12 will be described in detail.

The lower protective layer 121 is formed of a dielectric material. The function of this lower protective layer 121 is to prevent oxidation, corrosion and deformation of the recording layer 123, to adjust the optical distance so as to increase the optical absorption efficiency of the recording layer 123, and to increase the signal amplitude by increasing the change in the amount of reflected light before and after recording. For the lower protective layer 121, for example, oxides such as $SiO_x$ (where x is 0.5 to 2.5), $Al_2O_3$, $TiO_2$, $Ta_2O_5$, $ZrO_2$, $ZnO$, and Te—O can be used. Furthermore, nitrides such as C—N, Si—N, Al—N, Ti—N, Ta—N, Zr—N, Ge—N, Cr—N, Ge—Si—N, or Ge—Cr—N can be used. Moreover, sulfides such as ZnS or carbides such as SiC also can be used. Moreover, it is also possible to use a mixture of the above materials.

For example, ZnS—SiO$_2$, which is a mixture of ZnS and SiO$_2$, is particularly excellent as the material of the lower protective layer 121. This is because ZnS—SiO$_2$ is an amorphous material, which has a high refractive index, fast film formation speed, and favorable mechanical properties and resistance against moisture.

The thickness of the lower protective layer 121 can be determined precisely so as to satisfy the conditions that increase the change in the amount of the reflected light between when the recording layer 123 is in a crystalline phase and when it is in an amorphous phase and increase the transmittance of the first information layer 12 by calculation based on the matrix method (e.g., see the third chapter "Wave Optics", written by Hiroshi Kubota, Iwanami Shoten, 1971).

The upper protective layer 124 has the function to adjust the optical distance to increase the optical absorption efficiency of the recording layer 123, and the function to increase the signal amplitude by increasing the change in the amount of reflected light before and after recording. The upper protective layer 124 can be made using an oxide such as SiO$_2$, Al$_2$O$_3$, Bi$_2$O$_3$, Nb$_2$O$_5$, TiO$_2$, Ta$_2$O$_5$, ZrO$_2$, and ZnO. It also can be made using a nitride, such as C—N, Si—N, Al—N, Ti—N, Ta—N, Zr—N, Ge—N, Cr—N, Ge—Si—N, Ge—Cr—N or Nb—N. Moreover, sulfides such as ZnS, carbides such as SiC or C also can be used. Moreover, it is also possible to use a mixture of the above materials. When a nitride is used for the upper protective layer 124, the upper protective layer 124 serves to promote crystallization of the recording layer 123. In this case, materials containing Ge—N are preferable because they are formed easily by reactive sputtering, and have excellent mechanical properties and resistance against moisture. Of these, in particular, composite nitrides such as Ge—Si—N, or Ge—Cr—N are preferable. Furthermore, ZnS—SiO$_2$, which is a mixture of ZnS and SiO$_2$, is an amorphous material, and has a high refractive index, fast film formation speed, and favorable mechanical properties and resistance against moisture, and therefore also is an excellent material for the upper protective layer 124.

The film thickness d5 of the upper protective layer 124 is preferably in the range of $(1/64)\lambda/n5 \leq d5 \leq (1/4)\lambda/n5$, and more preferably $(1/64)\lambda/n5/d5 \leq (1/8)\lambda/n5$, where n5 is the refractive index of the upper protective layer 124. It should be noted that for example, when the wavelength $\lambda$ of the laser beam 2 and the refractive index n5 of the upper protective layer 124 satisfy 350 nm$\leq\lambda\leq$450 nm, $1.5 \leq n5 \leq 3.0$, the film thickness d5 is preferably in the range of 2 nm$\leq$d5$\leq$75 nm, more preferably 2 nm$\leq$d5$\leq$40 nm. By choosing the film thickness d5 from this range, it is possible to diffuse heat generated in the recording layer 123 effectively to the side of the reflective layer 125.

The transmittance adjusting layer 126 is made of a dielectric material, and has the function to adjust the transmittance of the first information layer 12. With this transmittance adjusting layer 126, it is possible to increase both the transmittance Tc (%) of the first information layer 12 when the recording layer 123 is in the crystalline phase and the transmittance Ta (%) of the first information layer 12 when the recording layer 123 is in the amorphous phase. More specifically, in the first information layer 12 provided with the transmittance adjusting layer 126, the transmittance is increased by about 2% to 10%, compared with the case without the transmittance adjusting layer 126. Moreover, the transmittance adjusting layer 126 also has the function to diffuse heat generated in the recording layer 123 effectively.

It is preferable that the refractive index n2 and the extinction coefficient k2 of the transmittance adjusting layer 126 satisfy $2.0 \leq n2$ and $k2 \leq 0.1$, more preferably $2.0 \leq n2 \leq 3.0$ and $k2 \leq 0.05$, in order to increase the effect of enhancing the transmittances Tc and Ta of the first information layer 12.

It is preferable that the film thickness d2 of the transmittance adjusting layer 126 is within the range of $(1/32)\lambda/n2 \leq d2 \leq (3/16)\lambda/n2$ or $(17/32)\lambda/n2 \leq d2 \leq (11/16)\lambda/n2$, and more preferably within the range of $(1/16)\lambda/n2 \leq d2 \leq (5/32)\lambda/n2$ or $(9/16)\lambda/n2 \leq d2 \leq (21/32)\lambda/n2$. It should be noted that when the wavelength $\lambda$ of the laser beam 2 and the refractive index n2 of the transmittance adjusting layer 126 are set to, for example, 350 nm$\leq\lambda\leq$450 nm and $2.0\leq n2\leq 3.0$, then it is preferable that the film thickness d2 is in the range of 3 nm$\leq$d2$\leq$40 nm or 60 nm$\leq$d2$\leq$130 nm, and more preferably in the range of 7 nm$\leq$d2$\leq$30 nm or 65 nm$\leq$d2$\leq$120 nm. By choosing the film thickness d2 from these ranges, both transmittances Tc and Ta of the first information layer 12 can be enhanced.

The transmittance adjusting layer 126 can be made using, for example, oxides such as TiO$_2$, ZrO$_2$, ZnO, Nb$_2$O$_5$, Ta$_2$O$_5$, or Bi$_2$O$_3$. It also can be made using a nitride, such as Ti—N, Zr—N, Nb—N, Ta—N, Si—N, Ge—N, Cr—N, Al—N, Ge—Si—N, or Ge—Cr—N. It is also possible to use a sulfide, such as ZnS. Moreover, it is also possible to use a mixture of the above materials. Of these, in particular TiO$_2$ or a material including TiO$_2$ as the main component is used preferably. These materials have a high refractive index (n2=2.5 to 2.8) and a low extinction coefficient (k2=0.0 to 0.05), so that the effect of enhancing the transmittance of the first information layer 12 is large. Moreover, the transmittance adjusting layer 126 further may contain an oxide such as SiO$_2$ or Al$_2$O$_3$.

The low refractive index layer 127 is made of a dielectric, and has the function to prevent moisture adsorbed to a base material (in the state before the transmittance adjusting layer 126 is formed) on which the transmittance adjusting layer 126 is to be formed from entering a film-formation chamber when forming the transmittance adjusting layer 126. When forming the transmittance adjusting layer 126 made of a dielectric material having a high refractive index by sputtering, this dielectric material having a high refractive index is very sensitive to an atmosphere for film formation. Therefore, when the low refractive index layer 127 is not provided, the film-forming rate tends to be varied by the influence of moisture or the like contained in the optical separating layer 13, but the variation in the film-forming rate can be suppressed by providing the low refractive index 127, as in this embodiment.

Since the low refractive index layer 127 does not have to have an optical function, it is preferable that the difference between the refractive index n1 of the low refractive index layer 127 and the refractive index n4 of the optical separating layer 13 in contact therewith is small, and it is preferable to satisfy $|n1-n4|\leq 0.5$. Furthermore, in order to provide the low refractive index layer 127 having a sufficient thickness, it is preferable that $|n1-n4|\leq 0.1$ is satisfied, that is, the difference in the refractive index is even smaller.

In a single-wafer film-forming apparatus, the overall film-forming throughput is determined by the rate that is limited by the rate in a chamber with the longest film-formation time. The film thickness d1 of the low refractive index layer 127 is preferably in the range from 1 nm or more and 25 nm or less in order not to reduce the overall film-forming throughput, and more preferably in the range from 5 nm or more and 15 nm or less. By choosing the film thickness d1 in the range above, the low refractive index layer 127 that effectively prevents oxygen from the base material from affecting the atmosphere in the film-formation chamber when forming the transmittance adjusting layer 126 without limiting the film-forming throughput by the rate for the low refractive index layer 127 can be provided.

The low refractive index layer 127 can be made using, for example, $SiO_2$, $Al_2O_3$, $LaF_3$, $ZrSiO_4$, or $ZrO_2$. Moreover, it is also possible to use a mixture of the above materials. Of these, in particular $SiO_2$ or a material including $SiO_2$ is used preferably. The refractive indexes of these materials are 1.4 to 1.6, and there is no large difference from the refractive index of the material generally used for the optical separating layer 13, and they are stable materials, and therefore are suitable as the material for the low refractive index layer 127.

The function of the lower interface layer 122 is to prevent the migration of substances between the lower protective layer 121 and the recording layer 123 due to repeated recording. The lower interface layer 122 can be made using nitrides such as C—N, Ti—N, Zr—N, Nb—N, Ta—N, Si—N, Ge—N, Cr—N, Al—N, Ge—Si—N, or Ge—Cr—N, oxides such as $Cr_2O_3$, or oxynitride containing these systems. Moreover, it can be made using C. Of these, materials containing Ge—N can be formed easily by reactive sputtering and become an interface layer having excellent mechanical properties and resistance against moisture. Of these, in particular, composite nitrides such as Ge—Si—N, or Ge—Cr—N are preferable. When the interface layer is thick, the reflectance or the absorption of the first information layer 12 is changed significantly so as to affect the recording/erasing performance. Therefore, it is preferable that the film thickness of the interface layer is in the range from 1 nm to 10 nm, more preferably in the range from 2 nm to 5 nm.

An upper interface layer further may be provided at the interface between the recording layer 123 and the upper protective layer 124. In this case, the upper interface layer can be made using the materials described with respect to the lower interface layer 122. It is preferable that the film thickness thereof is in the range from 1 nm to 10 nm (more preferably in the range from 2 nm to 5 nm) for the same reason as with the lower interface layer 122.

Interface layers may be arranged between the upper protective layer 124 and the reflective layer 125 and between the reflective layer 125 and the transmittance adjusting layer 126. These interface layers have the function to prevent migration of substances between the upper protective layer 124 and the reflective layer 125 and between the reflective layer 125 and the transmittance adjusting layer 126 under high temperature and high humidity and in recording. In this case, the interface layers can be made using the materials described with respect to the lower interface layer 122. It is preferable that the film thickness thereof is in the range from 1 nm to 10 nm (more preferably in the range from 2 nm to 5 nm) for the same reason as with the lower interface layer 122.

It is sufficient that the recording layer 123 contains a substance that can change between the crystalline state and the amorphous state (phase change material), and can be formed of a phase change material including, for example, Te, In or Se as the main component. Examples of the main component of well-known phase change materials include Te—Sb—Ge, Te—Ge, Te—Ge—Sn, Te—Ge—Sn—Au, Sb—Se, Sb—Te, Sb—Se—Te, In—Te, In—Se, In—Se—Tl, In—Sb, In—Sb—Se, and In—Se—Te. Of these, it was proved by investigating with experiments for materials that have favorable properties of repeated recording and erasure that compositions of these materials including three elements Ge, Sb, and Te as the main components are preferable. Furthermore, it also was proved that when the ratio of the atomic weight of these elements is expressed by $Ge_xSb_yTe_z$, the composition where $0.1 \leq x \leq 0.6$, $y \leq 0.5$, $0.4 \leq z \leq 0.65$ (where $x+y+z=1$) is particularly preferable.

In the optical disk 1 in this embodiment, it is necessary to make the film thickness of the recording layer 123 as small as possible to increase the transmittance of the first information layer 12 in order that the amount of laser light necessary for recording/reproduction reaches the second information layer 14. It is preferable that the film thickness of the recording layer 123 is in the range of 3 nm to 9 nm, and even more preferably in the range of 4 nm to 8 nm.

The reflective layer 125 has the optical function to increase the amount of light that is absorbed by the recording layer 123. The reflective layer 125 also has the thermal function to quickly diffuse heat that is generated in the recording layer 123 to allow easier amorphization of the recording layer 123. Furthermore, the reflective layer 125 also has the function to protect the multi-layer film from the environment in which it is used.

As the material of the reflective layer 125, it is possible to use a single metal with a high thermal conductivity, such as Ag, Au, Cu or Al. Moreover, an alloy including one or a plurality of these metal elements as the main component and to which one or a plurality of other elements are added in order to, for example, improve resistance against moisture or adjust thermal conductivity can be used. More specifically, alloys such as Al—Cr, Al—Ti, Au—Pd, Au—Cr, Ag—Pd, Ag—Pd—Cu, Ag—Pd—Ti, Ag—Ru—Au or Cu—Si can be used. In particular Ag alloys have a high thermal conductivity and a high transmittance of light, so that they are preferable as the material for the reflective layer 125.

It is preferable that the refractive index n3 and the extinction coefficient k3 of the reflective layer 125 satisfy $n3 \leq 2.0$, and $1.0 \leq k3$, and more preferably $0.1 \leq n3 \leq 1.0$, and $1.5 \leq k3 \leq 4.0$ in order further to increase the transmittance of the first information layer 12.

In order to make the transmittance Tc and the Ta of the first information layer 12 as high as possible, it is preferable that the film thickness d3 of the reflective layer 125 is in the range from 3 nm to 15 nm, more preferably 8 nm to 12 nm. When the film thickness d3 of the reflective layer 125 is 3 nm or more, a sufficient thermal diffusion function can be obtained, and sufficient reflectance for the first information layer 12 can be obtained. Furthermore, when the film thickness d3 of the reflective layer 125 is 15 nm or less, sufficient transmittance of the first information layer 12 can be obtained.

It is preferable that the refractive index n2 and the extinction coefficient k2 of the transmittance adjusting layer 126 and the refractive index n3 and the extinction coefficient k3 of the reflective layer 125 satisfy $1.0 \leq (n2-n3) \leq 3.0$ or $1.0 \leq (k3-k2) \leq 4.0$, more preferably $2.0 \leq (n2-n3) \leq 3.0$ or $1.5 \leq (k3-k2) \leq 3.0$. When these relationships are satisfied, light is confined in the transmittance adjusting layer 126 having a larger refractive index and a smaller extinction coefficient than those of the reflective layer 125, and the interference effect of light becomes large, so that the transmittance of the first information layer 12 can be increased. For example, when $TiO_2$ is used as the transmittance adjusting layer 126 and an Ag alloy is used as the reflective layer 125, n2=2.7, k2=0.0, n3=0.2, and k3=2.0 at a wavelength of 405 nm, and (n2-n3)=2.5 and (k3-k2)=2.0. Thus, the above relationship can be satisfied.

The optical separating layer 13 has the function to discriminate the focus position of the first information layer 12, in addition to the function to separate optically the first information layer 12 and the second information layer 14. It is necessary that the thickness of the optical separating layer 13 is equal to at least a focal depth $\Delta Z$ that is determined by the numerical aperture NA of the objective lens and the wavelength $\lambda$ of the laser beam 2. When it is assumed that the reference intensity at the focal point is 80% of that in the case of no aberration, $\Delta Z$ can be approximated to $\Delta Z=\lambda/\{2(NA)^2\}$. When $\lambda=400$ nm and NA=0.6, $\Delta Z=0.556$ μm, and the focal depth is within ±0.6 μm. Therefore, in this case, it is necessary that the thickness of the optical separating layer 13 is 1.2 μm or more. It is preferable that the distance to the first information layer 12 is in the range in which the laser beam 2 can be focused using an objective lens. Therefore, it is preferable that the total of the thickness of the optical separating layer 13 is within a tolerance (e.g., 50 μm or less) that can be allowed by the objective lens.

A guide groove for guiding the laser beam 2 may be formed on the surface of the optical separating layer 13 on the incident side of the laser beam 2, if necessary.

In order for the amount of laser light necessary for recording/reproduction to reach the information layer on the side opposite to the first information layer 12 when viewed from the incident side of the laser beam 2, it is preferable that the transmittances Tc and Ta of the first information layer 12 satisfy 40<Tc1, and 40<Ta1, and more preferably 43<Tc1 and 43<Ta1.

It is preferable that the transmittances Tc and Ta of the first information layer 12 satisfy $-5 \leq$ (Tc1−Ta1)$\leq 5$, and more preferably $-3 \leq$(Tc1−Ta1)$\leq 3$. When Tc1 and Ta1 satisfy these conditions, an effect of a change of the transmittance due to the state of the recording layer 123 of the first information layer 12 is small during recording/reproduction of the second information layer 14, and good recording/reproduction characteristics can be obtained.

It is preferable that the reflectances Rc1 and Ra1 of the first information layer 12 satisfy Ra1<Rc1. By doing this, the reflectance is high in an initial state in which information is not recorded, so that a recording/reproducing operation can be performed stably. Furthermore, it is preferable that Rc1 and Ra1 satisfy $0.1 \leq Ra1 \leq 5$ or $4 \leq Rc1 \leq 15$, more preferably, $0.5 \leq Ra1 \leq 3$ or $4 \leq Rc1 \leq 10$ so that a difference in the reflectance (Rc1−Ra1) can be large so that good recording/reproduction characteristics can be obtained.

Next, the structure of the second information layer 14 will be described in detail. The second information layer 14 is formed of a lower protective layer 141, a recording layer 142, an upper protective layer 143 and a reflective layer 144 that are arranged in this order from the incident side of the laser beam 2. In the second information layer 14, information is recorded/reproduced by the laser beam 2 that has passed through the first substrate 11, the first information layer 12 and the optical separating layer 13.

The lower protective layer 141 is formed of a dielectric material as the lower protective layer 121. The lower protective layer 141 has the function is to prevent oxidation, corrosion and deformation of the recording layer 142, to adjust the optical distance in order to increase the optical absorption efficiency of the recording layer 142, and to increase the signal amplitude by increasing the change in the amount of reflected light before and after recording. The lower protective layer 141 can be made using, for example, oxides such as $SiO_x$ (where x is 0.5 to 2.5), $Al_2O_3$, $TiO_2$, $Ta_2O_5$, $ZrO_2$, ZnO, and Te—O can be used. It also can be made using a nitride, such as C—N, Si—N, Al—N, Ti—N, Ta—N, Zr—N, Ge—N, Cr—N, Ge—Si—N, or Ge—Cr—N. Moreover, sulfides such as ZnS or carbides such as SiC also can be used. Moreover, it is also possible to use a mixture of the above materials. As in the case of the lower protective layer 121, ZnS—$SiO_2$ is particularly excellent as the material of the lower protective layer 141.

The film thickness of the lower protective layer 141 can be determined precisely so as to satisfy the conditions that increase the change in the amount of the reflected light between when the recording layer 142 is in a crystalline phase and when it is in an amorphous phase and increase the transmittance of the first information layer 12 by calculation based on the matrix method as in the case of the lower protective layer 121.

The upper protective layer 143 has the function to adjust the optical distance in order to increase the optical absorption efficiency of the recording layer 142, and the function to increase the carrier level by increasing the change in the amount of reflected light before and after recording, as in the case of the upper protective layer 124. The upper protective layer 143 can be made using an oxide such as $SiO_2$, $Al_2O_3$, $Bi_2O_3$, $Nb_2O_5$, $TiO_2$, $Ta_2O_5$, $ZrO_2$, and ZnO, as in the case of the upper protective layer 124. It also can be made using a nitride, such as C—N, Si—N, Al—N, Ti—N, Ta—N, Zr—N, Ge—N, Cr—N, Ge—Si—N, Ge—Cr—N or Nb—N. Moreover, sulfides such as ZnS, carbides such as SiC or C also can be used. Moreover, it is also possible to use a mixture of the above materials. When a nitride is used for the upper protective layer 143, the upper protective layer 143 serves to promote crystallization of the recording layer 123, as in the case of the upper protective layer 124. In this case, materials containing Ge—N are preferable because they are formed easily by reactive sputtering, and have excellent mechanical properties and resistance against moisture. Of these, in particular, composite nitrides such as Ge—Si—N or Ge—Cr—N are preferable. Furthermore, ZnS—$SiO_2$ also is an excellent material for the upper protective layer 143 as in the case of the upper protective layer 124.

An interface layer may be provided at the interface between the recording layer 142 and the upper protective layer 143 or the recording layer 142 and the lower protective layer 141. In this case, for the interface layer, the materials described with reference to the lower interface layer 122 can be used. For the same reason as with the lower interface layer 122, it is preferable that the film thickness is in the range from 1 nm to 10 nm, (more preferably 2 nm to 5 nm).

The material of the recording layer 142 in this embodiment is made of a material that changes the phase reversibly between the crystal phase and the amorphous phase by irradiation of the laser beam 2, as in the case of the recording layer 123. The recording layer 142 is made of a phase change material including, for example, Te, In or Se as the main component, as in the case of the recording layer 123. Examples of the main component of well-known phase change materials include Te—Sb—Ge, Te—Ge, Te—Ge—Sn, Te—Ge—Sn—Au, Sb—Se, Sb—Te, Sb—Se—Te, In—Te, In—Se, In—Se—Tl, In—Sb, In—Sb—Se, and In—Se—Te. Of these, it was proved by investigating with experiments for materials that have favorable repeated rewriting properties of recording and erasure and the compositions of these materials that materials including three elements Ge, Sb, and Te as the main components are preferable. Furthermore, when the ratio of the atomic weight of these elements is expressed by $Ge_xS_yTe_z$, the composition where $0.1 \leq x \leq 0.6$, $y \leq 0.5$, $0.4 \leq z \leq 0.65$, (where x+y+z=1) is particularly preferable.

In order to increase the recording sensitivity of the second information layer 14, it is preferable that the film thickness of the recording layer 142 is in the range of 6 nm to 20 nm. Even in this range, when the recording layer 142 is thick, heat is diffused in the in-plane direction so that thermal influence on an adjacent region becomes large, and when the recording layer 142 is thin, the reflectance of the second information layer 14 becomes small. Therefore, the film thickness of the recording layer 142 is more preferably in the range of 9 nm to 15 nm.

The reflective layer 144 has the optical function to increase the amount of light that is absorbed by the recording layer 142, as in the case of the reflective layer 125. Furthermore, as in the case of the reflective layer 125, the reflective layer 144 also has the thermal function to diffuse quickly heat that is generated in the recording layer 142, and to allow easier amorphization of the recording layer 142. Furthermore, the reflective layer 144 also has the function to protect the multilayer film from the environment in which it is used, as in the case of the reflective layer 125.

As the material of the reflective layer 144, it is possible to use a single metal with a high thermal conductivity, such as Ag, Au, Cu or Al, as in the case of the reflective layer 125. More specifically, alloys such as Al—Cr, Al—Ti, Au—Pd, Au—Cr, Ag—Pd, Ag—Pd—Cu, Ag—Pd—Ti, Ag—Ru—Au or Cu—Si can be used. In particular, Ag alloys have a high thermal conductivity and a high transmittance of light, so that they are preferable as the material for the reflective layer 144. The second information layer 14 is an information layer positioned farthest from the incident side of the laser beam. Therefore, the second information layer 14 does not need a high transmittance, so that it is preferable that the film thickness of the reflective layer 144 is 30 nm or more, which provides a sufficient thermal diffusion function. Even in this range, when the reflective layer 144 is thicker than 200 nm, the thermal diffusion function becomes too large, and the recording sensitivity of the second information layer 14 is decreased. Therefore, the film thickness of the reflective layer 144 is preferably in the range from 30 nm to 200 nm.

A metal layer may be provided at the interface between the upper protective layer 143 and the reflective layer 144. In this case, the material described with reference to the reflective layer 144 can be used for the metal material. The film thickness is preferably in the range from 3 nm to 100 nm (more preferably 10 nm to 50 nm).

Embodiment 2

One embodiment of a method for manufacturing an optical information recording medium of the present invention will be described. In this embodiment, a method for manufacturing the optical disk 1 (see FIG. 2) described in Embodiment 1 will be described.

First, an second information layer 14 is formed on a second substrate 15. More specifically, first, a second substrate 15 (thickness is, for example, 1100 µm) is prepared, and is disposed in a film-formation apparatus.

Then, a reflective layer 144 is formed on the second substrate 15. The reflective layer 144 can be formed by sputtering using a sputtering target including elements constituting the reflective layer 144 in an Ar gas atmosphere or an atmosphere of a mixed gas of Ar gas and a reactive gas (at least one gas selected from oxygen gas and nitrogen gas). In this case, when a guide groove for guiding the laser beam 2 to the second substrate 15 is formed, the reflective layer 144 is formed on the surface on the side in which the guide groove is formed.

Then, an upper protective layer 143 is formed on the reflective layer 144. The upper protective layer 143 can be formed by sputtering using a sputtering target including elements constituting the upper protective layer 143 in an Ar gas atmosphere or an atmosphere of a mixed gas of Ar gas and a reactive gas.

Then, a recording layer 142 is formed on the upper protective layer 143. Furthermore, an interface layer is formed between the upper protective layer 143 and the recording layer 142, if necessary.

The recording layer 142 can be formed by sputtering using a sputtering target made of a material including Te, In, Se or the like as the main component in accordance with its composition, using one power.

For the atmosphere gas (sputtering gas) for sputtering, Ar gas, Kr gas, a mixed gas of Ar gas and Kr gas, a mixed gas of Ar gas and a reactive gas, or a mixed gas of Kr gas and a reactive gas can be used.

As described in Embodiment 1, the film thickness of the recording layer 142 is preferably in the range from 6 nm to 20 nm, more preferably in the range from 9 nm to 15 nm. The film-forming rate of the recording layer 142 can be controlled by power introduced from a power source. If the film-forming rate is reduced too much, it takes a long time to form a film, and in addition to that, gas in the atmosphere can enter the recording layer more than necessary. If the film-forming rate is increased too much, the film-formation time can be short, but it becomes difficult to control the film thickness precisely. Therefore, the film-forming rate of the recording layer 142 is preferable in the range from 0.1 nm/sec. to 6 nm/sec.

Then, a lower protective layer 141 is formed on the recording layer 142. The lower protective layer 141 can be formed by sputtering using a sputtering target including elements constituting the lower protective layer 141 in an Ar gas atmosphere or an atmosphere of a mixed gas of Ar gas and a reactive gas. Furthermore, an interface layer is formed between the recording layer 142 and the lower protective layer 141, if necessary.

Thus, the second information layer 14 is formed. Then, an optical separating layer 13 is formed on the lower protective layer 141 of the second information layer 14. The optical separating layer 13 can be made by applying and spin-coating a light-curing resin (in particular a UV-curing resin) or a slow-acting heat-curing resin on the lower protective layer 141, and then curing the resin. When the optical separating layer 13 is provided with a guide groove of the laser beam 2, the guide groove can be formed by attaching a substrate (mold) for transfer in which the groove is formed to a resin that is not cured yet, curing the resin, and then detaching the substrate (mold) for transfer therefrom.

If necessary, it is also possible to perform an initialization step of crystallizing the entire recording layer 142, after the lower protective layer 141 has been formed or after the optical separating layer 13 has been formed. The crystallization of the recording layer 142 can be performed by irradiating a laser beam 2.

Subsequently, the first information layer 12 is formed on the optical separation layer 13. More specifically, first, a base material in which the second information layer 14 and the optical separating layer 13 are formed on the second substrate 15 is disposed in a film-forming apparatus, and a low refractive index layer 127 is formed on the optical separating layer 13. The low refractive index layer 127 can be formed by sputtering using a sputtering target including elements constituting the low refractive index layer 127 in an Ar gas atmosphere or an atmosphere of a mixed gas of Ar gas and a reactive gas.

Subsequently, the transmittance adjusting layer 126 is formed on the low refractive index layer 127. The transmittance adjusting layer 126 can be formed by sputtering using a sputtering target including elements constituting the transmittance adjusting layer 126 in an Ar gas atmosphere or an atmosphere of a mixed gas of Ar gas and a reactive gas.

Subsequently, the reflective layer 125 is formed on the transmittance adjusting layer 126. The reflective layer 125 can be formed by sputtering using a sputtering target including elements constituting the reflective layer 125 in an Ar gas atmosphere or an atmosphere of a mixed gas of Ar gas and a reactive gas.

Subsequently, the upper protective layer 124 is formed on the reflective layer 125. The upper protective layer 124 can be formed by sputtering using a sputtering target including elements constituting the upper protective layer 124 in an Ar gas atmosphere or an atmosphere of a mixed gas of Ar gas and a reactive gas.

Subsequently, the recording layer 123 is formed on the upper protective layer 124. The recording layer 123 can be formed by sputtering using a sputtering target made of a material including Te, In, Se or the like as the main component in accordance with its composition, using one power source.

For the sputtering gas atmosphere, it is possible to use Ar gas, Kr gas, a mixed gas of Ar gas and reactive gas, or a mixed gas of Kr gas and reactive gas.

It is preferable that the film thickness of the recording layer 123 is in the range of 3 nm to 9 nm, and even more preferably in the range of 4 nm to 8 nm, as described in Embodiment 1. The film-forming rate of the recording layer 123 can be controlled by the power introduced from a power source. When the film-forming rate is reduced too much, it takes a long time to form a film, and in addition to that, gas in the atmosphere enters the recording layer 123 more than necessary. When the film-forming rate is increased too much, the film forming time can be reduced, but it becomes difficult to control the film thickness precisely. Therefore, it is preferable that the film-forming rate of the recording layer 123 is in the range from 0.1 nm/sec to 6 nm/sec.

Subsequently, a low interface layer 122 is formed on the recording layer 123, if necessary. The lower interface layer 122 can be formed by sputtering using a sputtering target including elements constituting the lower interface layer 122 in an Ar gas atmosphere or an atmosphere of a mixed gas of Ar gas and a reactive gas.

Subsequently, a lower protective layer 121 is formed on the recording layer 123 or the lower interface layer 122, if necessary. The lower protective layer 121 can be formed in the same manner with the upper protective layer 124. The composition of the sputtering target used when forming these protective layers can be selected in accordance with the composition of the protective layer and the sputtering gas. In other words, these protective layers may be formed using sputtering targets having the same composition, or may be formed using sputtering targets having different compositions.

Interface layers may be arranged between the upper protective layer 124 and the reflective layer 125 and between the reflective layer 125 and the transmittance adjusting layer 126. The interface layers in this case can be formed in the same manner with the lower interface layer 122 (the same applies to the following interface layers).

Finally, the first substrate 11 is formed on the lower protective layer 121. The first substrate 11 can be made by applying and spin-coating a light-curing resin (in particular a UV-curing resin) or a slow-acting heat-curing resin on the lower protective layer 121, and then curing the resin. Furthermore, for the first substrate 11, transparent disk-shaped substrates made of resins such as polycarbonate, amorphous polyolefin or PMMA, or glass can be used. In this case, a light-curing resin (in particular a UV-curing resin) or a slow-acting heat-curing resin is applied on the lower protective layer 121, the substrate is adhered to the lower protective layer 121 and spin-coating is performed, and then the resin is cured to form the first substrate.

It should be noted that, if necessary, it is also possible to perform an initialization step of crystallizing the entire recording layer 123, after the lower protective layer 121 has been formed or after the first substrate 11 has been formed. The crystallization of the recording layer 123 can be performed by irradiating a laser beam 2. Thus, the optical disk 1 can be produced as described above.

Embodiment 3

In Embodiment 3, an example of a method for recording/reproducing information on/from an optical disk 1 as explained in Embodiment 1 will be described.

Figure 3:
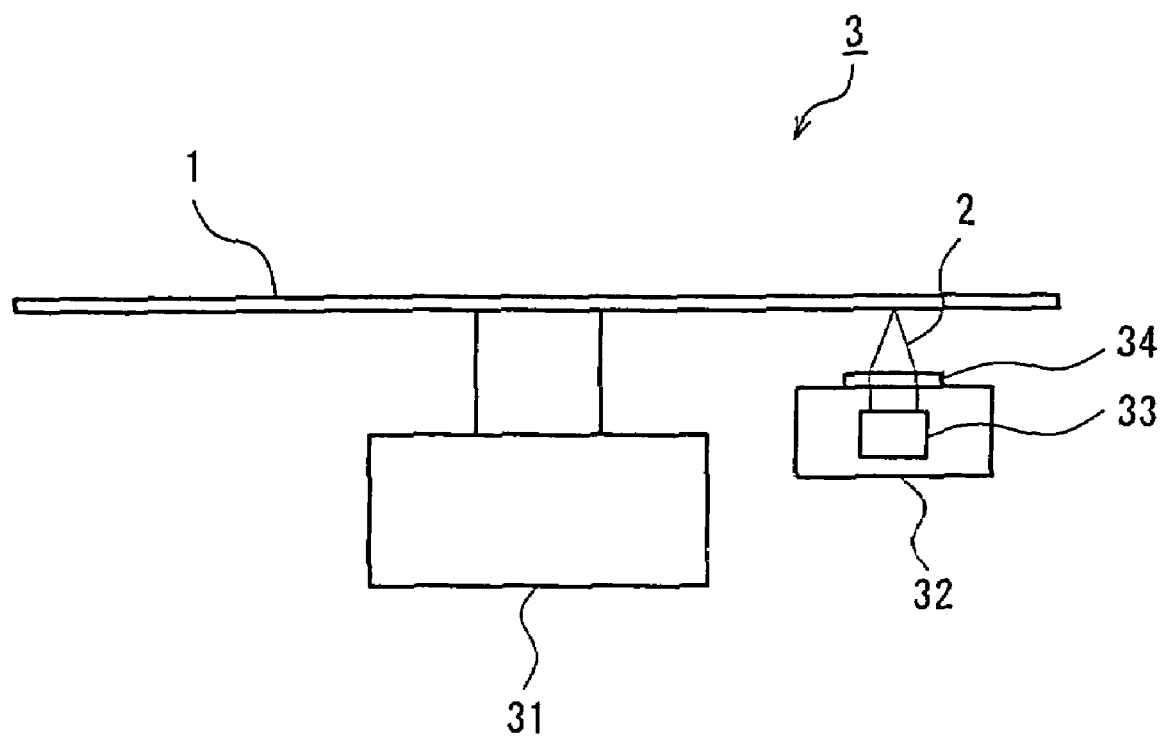
FIG. 3 is a view showing schematically the structure of a portion of a recording/reproducing apparatus for recording/reproducing information on/from the optical information recording medium of the present invention.
Figure 4:
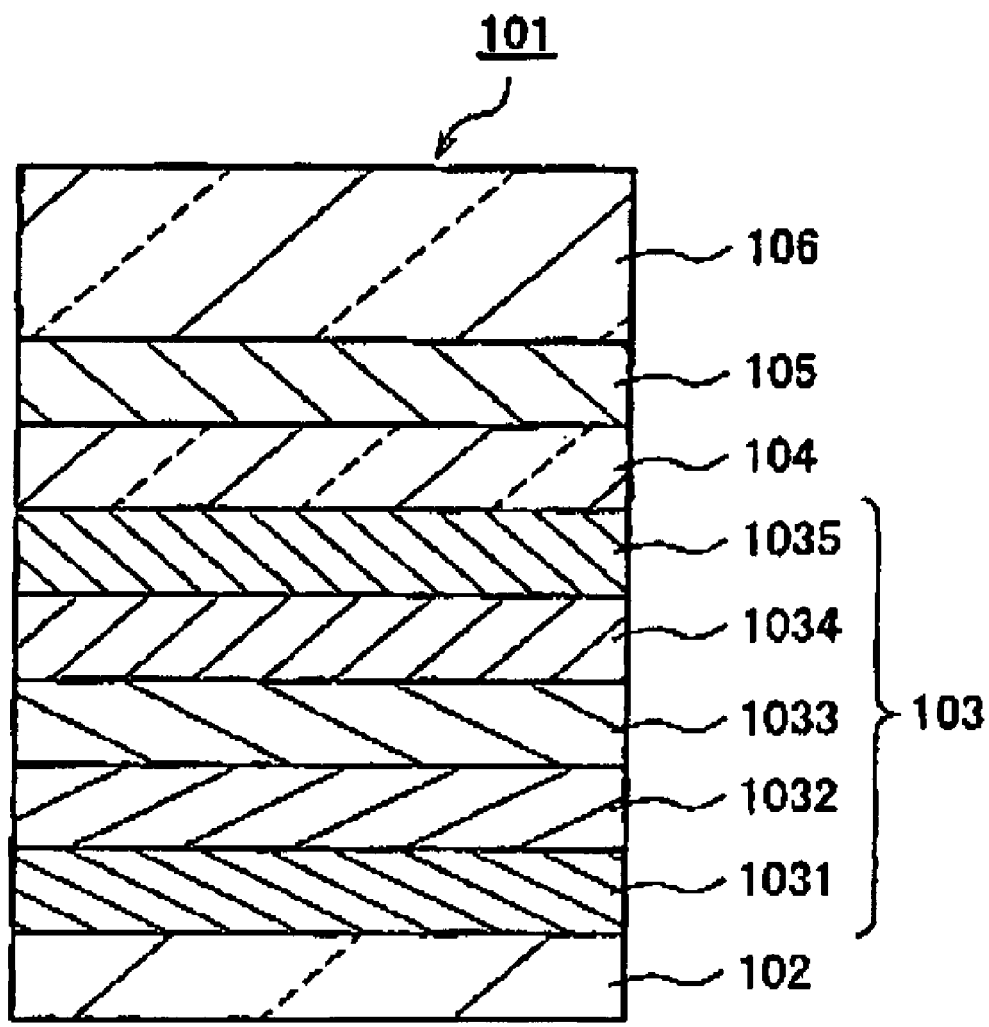
FIG. 4 is a cross-sectional view showing an example of the structure of a conventional optical information recording medium including two information layers.

First a recording/reproducing apparatus used for the recording/reproducing method in this embodiment will be described. FIG. 3 schematically shows the configuration of a portion of a recording/reproducing apparatus 3 used for a recording/reproducing method of this embodiment. The recording/reproducing apparatus 3 includes a spindle motor 31 for rotating an optical disk 1, an optical head 32 provided with a semiconductor laser 33, and an objective lens 34 for focusing the laser beam 2 emitted from the semiconductor laser 33. The optical disk 1 is an optical information recording medium described in Embodiment 1 and includes two information layers (the first information layer 12 and the second information layer 14). The first information layer 12 includes the recording layer 123, and the second information layer 14 includes the recording layer 142. The objective lens 34 focuses the laser beam 2 onto the information layers (the recording layer 123 in the case of the first information layer 12, and the recording layer 142 in the case of the second information layer 14.).

Information is recorded, erased and overwritten on the optical disk 1 (the first information layer 12 or the second information layer 14) by modulating the power of the laser beam 2 between the peak power (Pp (mW)) of a high power and the bias power (Pb (mW)) of a low power. By irradiating a laser beam 2 with the peak power, an amorphous phase is formed in a local portion of the recording layer 123 or 142, and this amorphous phase serves as a recording mark. Between recording marks, a laser beam 2 with the bias power is irradiated, and a crystalline phase (erased portion) is formed. It should be noted that if the laser beam 2 is irradiated with the peak power, then so-called multi-pulses are common, in which a pulse train is formed. The multi-pulses may be formed by modulating only with the power levels of the peak power and the bias power, or they may be formed by modulating with power levels in the range of 0 mW to the peak power.

Moreover, information signals are reproduced by setting as the reproduction power (Pr (mW)) a power that is lower than the power level of the peak power and the bias power, which does not influence the optical state of the recording marks when irradiating the laser beam 2 with this power level, and with which a sufficient amount of reflected light for the reproduction of the recording marks from the optical disk 1 can be attained. The signals from the optical disk 1 obtained by irradiating a laser beam 2 with this reproduction power are read with a detector, thus reproducing the information signal.

The numerical aperture (NA) of the objective lens 34 is preferably within the range of 0.5 and 1.1 (more preferably within the range of 0.6 and 1.0) in order to adjust such that the spot diameter of the laser beam is within the range of 0.4 μm and 0.7 μm. It is preferable that the wavelength of the laser beam 2 is not greater than 450 nm (more preferably in the range of 350 nm to 450 nm). It is preferable that the linear speed of the optical disk 1 when recording information is in the range of 3 m/sec to 20 m/sec (more preferably in the range of 4 m/sec to 15 m/sec), because in this range crystallization due to the reproduction light tends not to occur and a sufficient erasure capability is attained.

When recording information on the first information layer 12, the laser beam 2 is focused on the recording layer 123, and information is recorded on the recording layer 123 by the laser beam 2 that has passed through the first substrate 11. The reproduction is performed using the laser beam 2 that has been reflected by the recording layer 123 and passed through the first substrate 11. When recording information on the second information layer 14, the laser beam 2 is focused on the recording layer 142, and information is recorded with the laser beam 2 that has passed through the first substrate 11, the first information layer 12 and the optical separating layer 13. The reproduction of information is performed using the laser beam 2 that has been reflected by the recording layer 142 and passed through the optical separating layer 13, the first information layer 12 and the first information layer 12.

It should be noted that if guide grooves for guiding the laser beam 2 are formed in the second substrate 15 and the optical separating layer 13, then the recording may be performed on the groove surface (grooves) that is closer to the incident side of the laser beam 2, or on the groove surface (lands) that is further away therefrom. Information may be recorded on both the grooves and the lands.

WORKING EXAMPLES

The following is a more detailed explanation of the present invention using working examples.

Working Example 1

In Working Example 1, the film-forming rate of the transmittance adjusting layer when the low refractive index layer was provided was compared with the film-forming rate of the transmittance adjusting layer when the low refractive index layer is not provided. The film-forming rate was measured in the following manner in this example.

Five samples in which the low refractive index layer was provided and five samples in which the low refractive index layer was not provided were produced. The samples (samples 1-a, 1-b, 1-c, 1-d, and 1-e) in which the low refractive index layer was provided were formed by preparing a substrate for rate measurement and laminating $SiO_2$ (thickness: 10 nm) as the low refractive index layer and $TiO_2$ (thickness: 20 nm) as the transmittance adjusting layer sequentially on the substrate by sputtering. The samples (samples 1-f, 1-g, 1-h, 1-i, and 1-j) in which the low refractive index layer was not provided were formed by preparing a substrate for rate measurement and laminating $TiO_2$ (thickness: 20 nm) as the transmittance adjusting layer on the substrate by sputtering. By measuring the film thickness of each sample, the stability of the film-forming rate of $TiO_2$ was examined.

Table 1 shows the results of the measurement of the film thickness when the low refractive index layer is provided and not provided. The film-forming rate of $TiO_2$ is in the vicinity of 22.0 Å/sec, and therefore when ○ indicates that the rate is within ±1% from 22.0 Å/sec, and Δ indicates that the film-forming rate is within ±3%, and X indicates that the rate is ±3% or more.

TABLE 1

| sample No. | low refractive index layer | film-forming rate of $TiO_2$ (Å/sec) | evaluation | variation evaluation |
|---|---|---|---|---|
| 1-a | present | 22.1 | ○ | ○ |
| 1-b | present | 21.6 | Δ | |
| 1-c | present | 22.2 | ○ | |
| 1-d | present | 21.9 | ○ | |
| 1-e | present | 22.5 | Δ | |
| 1-f | absent | 15.6 | X | X |
| 1-g | absent | 18.6 | X | |
| 1-h | absent | 19.9 | X | |
| 1-i | absent | 16.7 | X | |
| 1-j | absent | 18.8 | X | |

The results confirmed the following. In the samples 1-a, 1-b, 1-c, 1-d, and 1-e that were provided with the low refractive index layer, the film-forming rate of $TiO_2$ was stable and had little variation, and films can be formed with sufficiently high reproducibility. On the other, in the samples 1-f, 1-g, 1-h, 1-i, and 1-j that were not provided with the low refractive index layer, the film-forming rate of $TiO_2$ was unstable and had a large variation. The same results were produced when the transmittance adjusting layer was not $TiO_2$ and the low refractive index layer was not $SiO_2$, for example, when the transmittance adjusting layer was $Nb_2O_5$ and the low refractive index layer was $Al_2O_3$. The results above confirmed that the configuration in which the low refractive index layer is provided is effective to stabilize the film-forming rate of the transmittance adjusting layer.

Working Example 2

In Working Example 2, the first information layer 12 of the optical disk 1 (see FIG. 2) was produced, and the relationship between the refractive index n1 and the film thickness d1 of the low refractive index layer 127 and the reflectance (Rc1, Rc2) of the first information layer 12 was investigated. More specifically, samples obtained by producing the first information layers 12 having different material and film thickness of the low refractive index layer 127, and further forming the first substrate 11 on the first information layer 12 were produced. Regarding the produced samples, the reflectance of the first information layer 12 was measured.

The samples were produced in the following manner. First, a polycarbonate substrate (diameter: 120 mm, thickness: 1100 μm, refractive index: 1.62) was prepared as a substrate. Then, on this polycarbonate substrate, the low refractive index layer 127, a $TiO_2$ layer (thickness: 20 nm) as the transmittance adjusting layer 126, a Ag—Pd—Cu layer (thickness: 10 nm) as the reflective layer 125, a Zr—Si—Cr—O layer (thickness: 10 nm) as the upper protective layer 124, a GeSbTe layer (thickness: 6 nm) as the recording layer 123, a Zr—Si—Cr—O layer (thickness: 5 nm) as the lower interface layer 122, and a ZnS—$SiO_2$ layer (thickness: 40 nm, ZnS: 80 mol %, $SiO_2$: 20 mol %) as the lower protective layer 121 were laminated sequentially by sputtering. An $SiO_2$ layer, an $Al_2O_3$ layer, a $ZrO_2$ layer, and a ZnS—$SiO_2$ layer were used as the low refractive index layer 127. Finally, the first substrate 11 was formed by applying a UV-curing resin on the lower protective layer 121, performing spin-coating with a polycarbonate substrate (diameter: 120 mm, thickness: 90 μm) adhered to the lower protective layer 121, and then irradiating UV rays to cure the resin. A plurality of samples for measuring the reflectance having different materials and thickness of the low refractive index layer 127 were produced in this manner.

Regarding the thus obtained samples, first, the reflectance Ra1 (%) in the case where the recording layer 123 is in an amorphous phase was measured. Thereafter, an initialization process to crystallize the recording layer 123 was performed, and the reflectance Rc1 (%) in the case where the recording layer 123 is in a crystalline phase was measured. For measurement of the reflectance, the recording/reproducing apparatus 3 shown in FIG. 3 was used. More specifically, the reflectance was measured by rotating the samples with a spindle motor 31, irradiating and focusing the laser beam 2 with a wavelength of 405 nm on the recording layer 123 of the first information layer 12 and measuring the amount of the reflected light.

Table 2 shows the results of the measurement of the reflectance (Rc1, Ra1) of the first information layer 12 in each sample. Table 2 also shows the material of the low refractive index layer 127 in each sample and the absolute value (|n1−n4|) of the difference between the refractive index n1 of the low refractive index layer 127 and the refractive index n4 of the optical separating layer 13 with respect to a laser beam of a wavelength of 405 nm. The refractive index n1 of the $SiO_2$ layer in a wavelength of 405 nm was 1.49, the refractive index n1 of the $Al_2O_3$ layer in a wavelength of 405 nm was 1.70, the refractive index n1 of the $ZrO_2$ layer in a wavelength of 405 nm was 2.12, and the refractive index n1 of the $ZnS$—$SiO_2$ layer in a wavelength of 405 nm was 2.34. The refractive index n4 of the transmittance adjusting layer 126 in a wavelength of 405 nm was 1.62. For evaluation, ○ indicates that the reflectance Rc1 in the specular portion of the substrate of the first information layer 12 when the recording layer 123 is in the crystalline phase is in the range $4 \leq Rc1 \leq 15$, and the reflectance Ra1 in the specular portion of the substrate of the first information layer 12 when the recording layer 123 is in the amorphous phase is in the range $0.1 \leq Ra1 \leq 5$, and Δ indicates that either one of them is outside that range.

TABLE 2

| sample No. | material of low refractive index layer | \|n1−n4\| | d1(nm) | Rc1 (%) | Ra1 (%) | evaluation |
|---|---|---|---|---|---|---|
| 2-a | $SiO_2$ | 0.13 | 1 | 6.4 | 1.4 | ○ |
| 2-b | $SiO_2$ | 0.13 | 5 | 6.2 | 1.3 | ○ |
| 2-c | $SiO_2$ | 0.13 | 10 | 5.9 | 1.2 | ○ |
| 2-d | $SiO_2$ | 0.13 | 20 | 5.7 | 1.0 | ○ |
| 2-e | $SiO_2$ | 0.13 | 25 | 5.2 | 0.9 | ○ |
| 2-f | $SiO_2$ | 0.13 | 30 | 5.1 | 0.9 | ○ |
| 2-g | $Al_2O_3$ | 0.08 | 1 | 6.5 | 1.5 | ○ |
| 2-h | $Al_2O_3$ | 0.08 | 5 | 6.6 | 1.5 | ○ |
| 2-i | $Al_2O_3$ | 0.08 | 10 | 6.8 | 1.6 | ○ |
| 2-j | $Al_2O_3$ | 0.08 | 20 | 7.1 | 1.8 | ○ |
| 2-k | $Al_2O_3$ | 0.08 | 25 | 7.3 | 1.9 | ○ |
| 2-l | $Al_2O_3$ | 0.08 | 30 | 7.4 | 1.9 | ○ |
| 2-m | $ZrO_2$ | 0.50 | 1 | 6.7 | 1.6 | ○ |
| 2-n | $ZrO_2$ | 0.50 | 5 | 7.8 | 2.2 | ○ |
| 2-o | $ZrO_2$ | 0.50 | 10 | 9.3 | 3.0 | ○ |
| 2-p | $ZrO_2$ | 0.50 | 20 | 11.8 | 4.5 | ○ |
| 2-q | $ZrO_2$ | 0.50 | 25 | 12.6 | 4.9 | ○ |
| 2-r | $ZrO_2$ | 0.50 | 30 | 12.9 | 5.2 | Δ |
| 2-s | $ZnS$—$SiO_2$ | 0.72 | 1 | 6.8 | 1.6 | ○ |
| 2-t | $ZnS$—$SiO_2$ | 0.72 | 5 | 8.4 | 2.5 | ○ |
| 2-u | $ZnS$—$SiO_2$ | 0.72 | 10 | 10.5 | 3.8 | ○ |
| 2-v | $ZnS$—$SiO_2$ | 0.72 | 20 | 13.8 | 5.8 | Δ |
| 2-w | $ZnS$—$SiO_2$ | 0.72 | 25 | 14.6 | 6.3 | Δ |
| 2-x | $ZnS$—$SiO_2$ | 0.72 | 30 | 14.9 | 6.5 | Δ |

These results show that the samples 2-a, 2-b, 2-c, 2-d, 2-e, and 2-f in which the material of the low refractive index layer 127 is made of $SiO_2$ and has a film thickness d1 of 1 nm to 30 nm have a more preferable reflectance satisfying $4 \leq Rc1 \leq 15$, and $0.1 \leq Ra1 \leq 5$.

Furthermore, the samples 2-g, 2-h, 2-i, 2-j, 2-k, and 2-l in which the material of the low refractive index layer 127 is made of $Al_2O_3$ and has a film thickness d1 of 1 nm to 30 nm have a more preferable reflectance satisfying $4 \leq Rc1 \leq 15$, and $0.1 \leq Ra1 \leq 5$.

Furthermore, the samples 2-m, 2-n, 2-o, 2-p, and 2-q in which the material of the low refractive index layer 127 is made of $ZrO_2$ and has a film thickness d1 of 1 nm to 25 nm have a more preferable reflectance satisfying $4 \leq Rc1 \leq 15$, and $0.1 \leq Ra1 \leq 5$. The reflectance Ra1 of a sample 2-r having a film thickness d1 of 30 nm was larger than 5%.

Furthermore, the samples 2-s, 2-t, and 2-u in which the material of the low refractive index layer 127 is made of $ZnS$—$SiO_2$ and has a film thickness d1 of 1 nm to 10 nm have a more preferable reflectance satisfying $4 \leq Rc1 \leq 15$, and $0.1 \leq Ra1 \leq 5$. The reflectance Ra1 of samples 2-v, 2-w, and 2-x having a film thickness d1 of 20 to 30 nm was larger than 5%.

As shown in Table 2, when a material having a large refractive index n1 is used for the low refractive index layer 127, Rc1 and Ra1 become large.

The above results confirmed that when the low refractive index layer 127 is formed with a film thickness in the range (1 nm to 25 nm) that prevents the overall film-forming throughput from being reduced, it is preferable that the refractive index n1 of the low refractive index layer 127 and the refractive index n4 of the optical separating layer 13 satisfy the relationship $|n1-n4| \leq 0.5$ in order to obtain more preferable reflectance characteristics ($4 \leq Rc1 \leq 15$, and $0.1 \leq Ra1 \leq 5$). It also was confirmed that when a value of |n1−n4| is reduced further, satisfactory reflectance characteristics can be obtained, even if the film thickness d1 exceeds 25 nm.

INDUSTRIAL APPLICABILITY

According to the optical information recording medium and the method for manufacturing the same of the present invention, a variation in the film-forming rate of a transmittance adjusting layer contained in an optical information recording medium provided with a plurality of information layers can be suppressed, so that the transmittance adjusting layer can be formed stably. Thus, an optical information recording medium that can provide a good recording sensitivity and a sufficient C/N ratio, although a plurality of information layers are included.

The invention claimed is:

1. An optical information recording medium comprising a substrate, a plurality of information layers being provided on the substrate, and an optical separating layer being provided between adjacent information layers, in which information is recorded or reproduced by irradiation of a laser beam, wherein when an information layer being provided closest to a laser beam incident side of the plurality of information layers is taken as a first information layer and an optical separating layer being provided in contact with the first information layer is taken as a first optical separating layer, the first information layer comprises a recording layer that can change between two optically different states, a transmittance adjusting layer that adjusts a transmittance of the first information layer, and a low refractive index layer being provided between and in contact with the transmittance adjusting layer and the first optical separating layer, the low refractive index layer being formed on the optical separating layer, and the transmittance adjusting layer being formed on the low refractive index layer, wherein refractive indices with respect to the laser beam of the transmittance adjusting layer and the low refractive index layer are in ranges of 2.0 to 3.0 and 1.4 to 1.6, respectively, and when the refractive index of the low refractive index layer is taken as n1, and the refractive index of the first optical separating layer is taken as n4, n1 and n4 satisfy:

$|n1-n4| \leq 0.5$.

2. The optical information recording medium according to claim 1, wherein n1 and n4 satisfy:

$|n1-n4| \leq 0.1$.

3. The optical separating layer according to claim 1,
wherein the recording layer contained in the first information layer is formed of a material that can change between a crystalline state and an amorphous state, and when a transmittance of the first information layer with respect to the laser beam when the recording layer is in the crystalline state is taken as Tc1 (%), and a transmittance of the first information layer with respect to the laser beam when the recording layer is in the amorphous state is taken as Ta1 (%), Tc1 and Ta1 satisfy:

40<Tc1 and 40<Ta1.

4. The optical information recording medium to claim 1,
wherein the first information layer further comprises a reflective layer being provided between the recording layer and the transmittance adjusting layer, when a refractive index of the transmittance adjusting layer with respect to the laser beam is taken as n2, an extinction coefficient thereof is taken as k2, a refractive index of the reflective layer with respect to the laser beam is taken as n3, and an extinction coefficient is taken as k3, at least one of the following relationships between n2 and n3 and between k2 and k3 is satisfied:

$1.0 \leq (n2-n3) \leq 3.0$ and $1.0 \leq (k3-k2) \leq 4.0$.

5. The optical information recording medium according to claim 1,
wherein the low refractive index layer comprises at least one selected from the group consisting of $SiO_2$, $Al_2O_3$, $LaF_3$, $ZrSiO_4$, and $ZrO_2$.

6. The optical information recording medium according to claim 1,
wherein the low refractive index layer has a film thickness of 1 nm or more and 25 nm or less.

* * * * *